(12) United States Patent
Villoria et al.

(10) Patent No.: US 9,166,976 B2
(45) Date of Patent: Oct. 20, 2015

(54) CREATION AND MANAGEMENT OF DIGITAL CONTENT AND WORKFLOW AUTOMATION VIA A PORTABLE IDENTIFICATION KEY

(71) Applicants: Stephen Villoria, Newbury Park, CA (US); Remco Treffkorn, Aptos, CA (US); Kevin Bergner, Fremont, CA (US); James Patrick Block, Long Beach, CA (US)

(72) Inventors: Stephen Villoria, Newbury Park, CA (US); Remco Treffkorn, Aptos, CA (US); Kevin Bergner, Fremont, CA (US); James Patrick Block, Long Beach, CA (US)

(*) Notice: Subject to any disclaimer, the term of this patent is extended or adjusted under 35 U.S.C. 154(b) by 0 days.

(21) Appl. No.: 13/654,399

(22) Filed: Oct. 17, 2012

(65) Prior Publication Data

US 2013/0097689 A1 Apr. 18, 2013

Related U.S. Application Data

(60) Provisional application No. 61/548,195, filed on Oct. 17, 2011.

(51) Int. Cl.
*G06F 17/30* (2006.01)
*H04L 29/06* (2006.01)

(52) U.S. Cl.
CPC .......... *H04L 63/0853* (2013.01); *H04L 63/102* (2013.01)

(58) Field of Classification Search
CPC ....... G06F 9/4413; G06F 21/10; G11B 20/10; H04L 2209/60; H04L 63/0853; H04L 63/102
See application file for complete search history.

(56) References Cited

U.S. PATENT DOCUMENTS

| | | | |
|---|---|---|---|
| 5,886,274 A * | 3/1999 | Jungleib | 84/601 |
| 6,598,074 B1 * | 7/2003 | Moller et al. | 709/204 |
| 6,952,281 B1 * | 10/2005 | Irons et al. | 358/1.15 |
| 7,124,938 B1 * | 10/2006 | Marsh | 235/382 |
| 7,756,792 B2 * | 7/2010 | Hughes | 705/57 |
| 7,770,226 B2 * | 8/2010 | Ahn | 726/26 |
| 8,260,978 B1 * | 9/2012 | Thompson et al. | 710/20 |
| 2002/0099665 A1 * | 7/2002 | Burger et al. | 705/67 |
| 2003/0145211 A1 * | 7/2003 | Fukawa | 713/182 |
| 2004/0128420 A1 * | 7/2004 | Su et al. | 710/302 |
| 2004/0212735 A1 * | 10/2004 | Kitamura | 348/553 |
| 2004/0220879 A1 * | 11/2004 | Hughes | 705/57 |
| 2006/0190621 A1 * | 8/2006 | Kamperman et al. | 709/245 |
| 2006/0190941 A1 * | 8/2006 | Kobayashi et al. | 717/174 |
| 2006/0200467 A1 * | 9/2006 | Ohmori et al. | 707/9 |
| 2006/0208066 A1 * | 9/2006 | Finn et al. | 235/380 |

(Continued)

FOREIGN PATENT DOCUMENTS

WO   WO 2004/081706   * 9/2004

*Primary Examiner* — Taghi Arani
*Assistant Examiner* — Sharon Lynch
(74) *Attorney, Agent, or Firm* — Antonio Papageorgiou, Esq.; Meister Seelig & Fein LLP (57) ABSTRACT

The present invention is directed towards a method and system for automating workflow. The method and system includes receiving data from a portable identification key communicatively coupled to a processing device to initiate automation processes. The profile information comprised in the data is accessed, the profile information including an identification of a user associated with the portable identification key. The method and system further includes retrieving one or more instructions and parameters associated with the identified user by the processing device to initiate an automated workflow session, and initiating the automated workflow session according to the one or more instructions and parameters.

17 Claims, 4 Drawing Sheets

(56) References Cited

U.S. PATENT DOCUMENTS

| | | | |
|---|---|---|---|
| 2007/0050298 A1* | 3/2007 | Givoly | 705/52 |
| 2007/0088813 A1* | 4/2007 | Floyd | 709/223 |
| 2007/0266446 A1* | 11/2007 | Aaron | 726/30 |
| 2008/0082813 A1* | 4/2008 | Chow et al. | 713/2 |
| 2008/0113797 A1* | 5/2008 | Egozy | 463/35 |
| 2008/0195546 A1* | 8/2008 | Lilley | 705/59 |
| 2008/0244706 A1* | 10/2008 | Lenoir et al. | 726/4 |
| 2009/0059090 A1* | 3/2009 | Fan et al. | 348/734 |
| 2009/0070600 A1* | 3/2009 | Diascorn et al. | 713/193 |
| 2009/0144622 A1* | 6/2009 | Evans et al. | 715/706 |
| 2009/0282451 A1* | 11/2009 | Jensen | 725/117 |
| 2009/0315670 A1* | 12/2009 | Naressi et al. | 340/5.8 |
| 2010/0115145 A1* | 5/2010 | Banerjee et al. | 710/10 |
| 2010/0161997 A1* | 6/2010 | Lee et al. | 713/189 |
| 2010/0167648 A1* | 7/2010 | Doutriaux | 455/41.2 |
| 2010/0212478 A1* | 8/2010 | Taub et al. | 84/645 |
| 2010/0216549 A1* | 8/2010 | Salter | 463/31 |
| 2011/0131492 A1* | 6/2011 | Chen | 715/716 |
| 2011/0179204 A1* | 7/2011 | Hulbert et al. | 710/74 |
| 2012/0232929 A1* | 9/2012 | Experton | 705/3 |

* cited by examiner

CREATION AND MANAGEMENT OF DIGITAL CONTENT AND WORKFLOW AUTOMATION VIA A PORTABLE IDENTIFICATION KEY

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention described herein generally relates to automating workflow processes, such as for the creation, management, and delivery of digital media. More particularly, the invention relates to secure systems that automate workflow processes used in the creation, transmission, distribution, management, delivery, and archiving of digital media content in a network environment and provide secure access to all data resulting from such workflow. Moreover, the present invention initiates workflow automation processes for virtually any electrical, electronic, computer, mechanical or electromechanical systems and equipment that may be associated with the delivery of digital media content or with a given application or event.

BACKGROUND OF THE INVENTION

Streaming digital media in the form of video, audio, graphics and associated data across a network is an efficient way for content creators and providers to reach a large audience at lower costs. Increasingly, organizations use digital media technologies for education, training, marketing, video and audio archiving of meetings, tutorials, webinars, webcasts, and mass distribution of digital content to large consumer bases for commercials, new product introduction, and other applications. Academic and medical institutions are using digital media content and streaming technologies as pervasive and spatially unbounded classroom training tools that enable students and teachers to capture educational events such as university lectures or operating room procedures, distribute that content to a large institutional base, and access that content anytime or from anywhere in the future. Many businesses are using these media tools to record meetings, training, and presentations and then stream that content live and/or archive the content for later use. In many cases, this technology is gradually replacing the old system of tape recording or writing down meeting minutes. In education, this technology is used pervasively for an e-learning-type curriculum, and therefore, a new breed of institutions has emerged that relies solely on this technology, known as "virtual campuses."

In order to maintain access privileges, privacy rights and generate the growing amount of metadata necessary to catalog, publish, and manage the digital content, highly-trained technicians and administrators are currently required to operate and maintain even small-to-medium scale content management systems. Setting up any streaming media system for presenting real-time and on demand content to users is a laborious and complex process requiring highly trained personnel to set up systems, create, manage, and distribute the content across a network. Many companies such as Cisco WebEx®, Citrix GoToMeeting®, Sonic Foundry's Mediasite®, and On24®, provide managed services to make the process simpler. Granular access control to protect confidentiality of content is required by law for many sectors, such as the legal, medical, and defense sectors. This security must be maintained for long periods of times and constantly, in many cases. Securing access to digital media with this multi-tier access even prevents some users from using digital media content at all. For example, medical privacy laws, such as the Health Insurance Portability and Accountability Act (HIPAA), prohibits technical personnel to view or access sensitive content of individuals. Since most medical staff lack the necessary skills to input the associated metadata and operate such systems, some medical institutions have stopped using streaming systems completely to ensure privacy rights are maintained.

Current digital content management systems require several steps that are not automated. For example, a user must initiate a recording and/or streaming session by manually operating a piece of equipment or system that is designed for recording and/or streaming. Further, additional parameters must be set, such as input sources, file formats, resolution, bit rate, frame rate, color depth, etc. Also, a user must designate an IP address and/or filename for the digital content, as well as a destination (e.g. network drive, directory) for the recorded content. Currently, a user must manually enter metadata (e.g. title, description, keywords, date produced, copyright, author, etc.) into fields in the software of the content management system to attach information to the recorded media file that is necessary for the management of the content. Also, to distribute the content, a user must make copies or move the content to each destination (e.g. network drives, directories, etc.) in order to make the content accessible to the appropriate individuals or departments. This often requires a complex process of transcoding the media into various formats for various types of computers and personal electronics. Currently digital content management systems do not provide the means for the initialization and sequencing of commands for automating and managing external computer, electric, electronic, mechanical and electromechanical systems and equipment that may be associated with the delivery of digital media, or with a given application or event.

There is thus a need in multiple areas of business to provide an automated system and method to create digital multimedia content and distribute and manage the content delivery while maintaining a high level of security and controlled access to the content. There is also a need to provide a system that automates the initialization and sequencing of commands for automating and managing external computer, electrical, electronic, mechanical and electromechanical systems and equipment that may be associated with the delivery of digital media, or with a given application or event.

SUMMARY OF THE INVENTION

The present application provides methods and systems for automating workflow. The method according to one embodiment includes receiving data from a portable identification key communicatively coupled to a processing device to initiate automation processes. The profile information comprised in the data accessed includes an identification of a user associated with the portable identification key. The method and system further includes retrieving one or more instructions and parameters associated with the identified user by the processing device to initiate an automated workflow session, and initiating the automated workflow session according to the one or more instructions and parameters.

The portable identification key may comprise at least one of a smartcard, secure Universal Serial Bus device, Radio-Frequency Identification card, or magnetic strip card. In other embodiments, the portable identification key may comprise at least one of a touch-screen, numeric keypad, fingerprint reader, retinal scanner, voice recognition system, a facial recognition system, etc. The profile information may include at least one of an identification of a user, a user group, and an application. According to one embodiment, the application comprises one of a video newsletter, an internal broadcast, and a seminar.

Retrieving one or more instructions and parameters may further comprise retrieving a list of commands relating to specific actions that the processing device should perform. In another embodiment, retrieving one or more instructions and parameters further comprises retrieving a list of technical settings and parameters required for a given workflow session. The method further comprises receiving digital media content from one or more media capture devices. The automated workflow session may include a recording of the digital media content and wherein the recording of the digital media content is stored on the processing device according to the retrieved parameters.

A workflow session may be ended upon detection of a removal of the portable identification key from the processing device. Retrieving one or more instructions and parameters associated with the identified user may comprise retrieving the one or more instructions and parameters from the portable identification key. According to another embodiment, retrieving one or more instructions and parameters associated with the identified user comprises retrieving the one or more instructions and parameters from a remote server. The method may further comprise determining whether a user is authorized to access the processing device. Determining whether a user is authorized to access the processing device may further include determining privilege settings for the user. The method may further comprise performing a query to match the profile information with the processing device. In one embodiment, the method further comprises creating metadata that uniquely identifies a workflow session. The processing device may include one or more instructions configured to perform automated workflow processes according to the data received from the portable identification key.

Another embodiment of the present invention includes a portable identification key for automating workflow. The portable identification key comprises a computer readable medium comprising data that when received by a processing device causes the processing device to initiate automation processes. The data comprises profile information including an identification of a user associated with the portable identification key, and one or more executable instructions and parameters associated with the identified user of the processing device that when executed by the processing device cause the processor to initiate an automated workflow session, the automated workflow session initiated according to the one or more instructions and parameters.

In yet another embodiment of the present invention, a processing device for automating workflow is provided. The processing device is configured to receive data from a portable identification key communicatively coupled to the processing device to initiate automation processes, access profile information comprised in the data, the profile information including an identification of a user associated with the portable identification key. The processing device is further configured to retrieve one or more instructions and parameters associated with the identified user to initiate an automated workflow session, and initiate the automated workflow session according to the one or more instructions and parameters.

Another aspect of the present application provides a method and a system for automating workflow and securing access to digital content in creating, streaming, distribution, content management, and archiving of digital media content, and automatically operating associated systems. According to one embodiment, the method provides for creating and managing digital media content. The method includes activating a digital processing device to initiate an automation process, wherein the digital processing device allows for capturing, recording and streaming media. The method further includes determining if the digital processing device is recognized and upon determining that the digital processing device is recognized, determining if a user is authorized to access the digital processing device and if a privilege setting has been set for the user.

According to another aspect of the present application, the system includes a portable identification key. The portable identification key may contain secure, individualized information with device-specific instructions used in the creating, streaming, distribution, content management, and archiving of digital media content, and initiating automated processes for ancillary equipment, such as room light, projectors, switching systems, and audio equipment. The information contained in the portable identification key may be enabled to set bit rates, display resolutions, file formats for encoding, transcoding, and specialized settings for devices, such as mobile devices, standalone media playback devices and applications (such as web browsers). The portable identification key may automate processes such as activation and automation of electrical, mechanical, electronic, and electromechanical systems and equipment, such as camera presets, focus, zoom, exposure, dimming lights, lowering and raising projection screen, adjustments, and setting parameter for projectors, audio equipment and the like, associated with delivering the content or with a given application or event. The portable identification key may also contain information, such as title, author, copyright, session type, or in an education setting, lecturer, class name, title, data, etc. Upon activation of a session, any part or all of the information may be stored as metadata part of a live or recorded bit stream and incorporated into a database on a digital media server while remaining part of the recorded bit stream.

Upon determining that the user is authorized to access the digital processing device and the privilege setting has been set for the user, profile information is accessed in the portable identification key, wherein the profile information includes a user description, a user group and/or an application. The method also includes querying the digital processing device to match profile information in the portable identification key. Parameter information is created that identifies a capture, streaming and/or recording session, and the profile information from the portable identification key. A capture, streaming and/or recording session is initiated that captures, streams, and/or records the digital media content to the digital processing device according to the parameter information. The digital processing device is instructed to perform actions associated with the delivery of digital content. Digital content that is captured during the capture, streaming, and/or recording session may be stored on the digital processing device or remotely. In another embodiment, the removal of the portable identification key is detected, and upon the detection of the removal of the portable identification key, the capture, streaming, and/or recording session associated with the parameter information may be ended. Instruction sets, information, and parameters contained in the portable identification key may be incorporated into the resulting file by digital processing device as metadata and stored in a database. The database may be located on a central storage device. The metadata may also stay in the recorded bit stream.

Another aspect of the present application provides a method for uploading digital media content. The method includes removing a portable identification key from a digital processing device, ending a capture session that captures digital media content relating to parameter information. The method further includes creating a file that is in one or multiple digital file formats and that may be encrypted, and includes a name that is appropriate based on the profile information stored on the portable identification key. The file is tagged with further identifying information such as descriptions, keywords, author, date, or time. The file may then be uploaded via a network to a central storage device. Copies of the file may be distributed to a specific group of users, or applications. The file may be automatically deleted from the digital processing device to prevent unauthorized access depending on the parameter information. In another embodiment, the file may not be deleted but remains in the encrypted format, when used, for archiving. Generally, the workflow is performed according to instructions obtained from the particular user's profile.

In yet another aspect described in the present application is a secure content management system for creating, managing, and distributing digital media content. The system includes a digital processing device that is capable of receiving input and performing actions based on the input. The system also includes a portable identification key comprising an electronic device that uniquely identifies users, groups and/or applications. The portable identification key may be a removable device that identifies instruction sets and parameters to the digital processing device. The digital processing device captures digital media content and associates the digital media content during a capture session with the data of the connected portable identification key. Once the portable identification key is removed the capture session ends. The digital processing device is communicatively coupled to a network which includes a centrally located storage device.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

In the following description of the various embodiments of the methods and systems discussed herein, reference is made to the accompanying drawings that form a part hereof, and in which is shown by way of illustration, exemplary embodiments in which the invention may be practiced. It is to be understood that other embodiments may be utilized and structural changes may be made without departing from the scope of the present invention.

Figure 1:
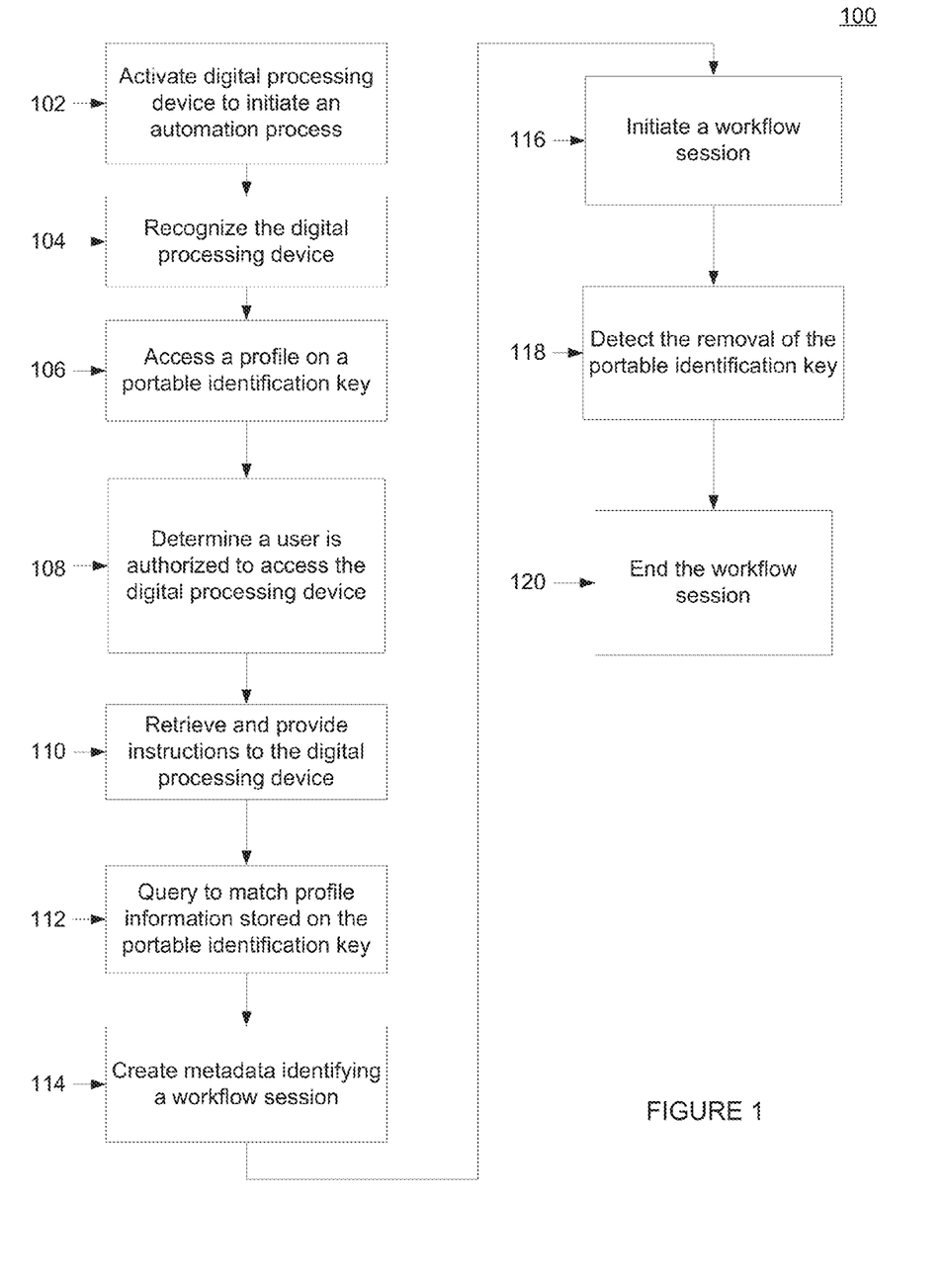
FIG. 1 illustrates a flowchart of a method for creating and managing digital media content.

FIG. 1 is a flowchart of a method for creating and managing digital media content according to one embodiment of the methods disclosed herein. The method generally begins by activating a digital processing device is activated to initiate an automation process, at step 102. Activation of the digital processing device may include, but is not limited to, turning the device on, starting a particular application on the device, connection the device to a network, etc. It is understood that various types of automation processes may be initiated in accordance with the methods disclosed herein. In one embodiment, the digital processing device is capable of receiving, capturing, recording, and/or streaming digital media content. In this instance, the automation processes may include processes to prepare the digital processing device to receive and capture digital media content. The digital media content may be received from a network or from another source.

Examples of the types of sources a digital processing device may capture content from includes various media capture devices such as cameras, microphones, document cameras, still cameras, set top boxes, or any computing device with capability of displaying or otherwise outputting graphics, video, audio, still images, or any software application that can output to a capture or the digital processing device. The digital processing device may be separate from the media capture device or may be combined in a single unit with the media capture device. The digital processing device may include software that enables the device to receive input data and perform actions based on the input. The type of input data may be simple or complex depending on the type of content or application. At step 104, the digital processing device is recognized. The digital processing device may be recognized, for example, when connected to a network for data transmission or content management. The digital processing device may need to be recognized among the network to communicate with other devices correctly.

In at least one embodiment, the automation processes are initiated with a portable identification key. A portable identification key may be any object or device capable of identifying a particular user, including a device connected to or capable of being connected to the digital processing device such as, a smartcard, secure Universal Serial Bus (USB) device, Radio-Frequency Identification (RFID) card, magnetic strip card, a bar code, or any other portable data storage medium, a smart phone or personal digital assistant (PDA), a biometric reader, etc. The portable identification key may store data such as, 1) identification of a user, department, or application, 2) in-depth metadata about a user, user group, application, and/or recording, 3) a list of commands relating to specific actions that a digital processing device should perform, 4) a list of technical settings and parameters required for a given workflow session, 5) instructions to the digital processing device for actions to perform either internally or on other external computer, electrical, electronic, mechanical and electromechanical systems and equipment, 6) or any combination of the above. The types of groups may include classes, teams, departments, etc. The types of applications may be a video newsletter, an internal broadcast, a seminar, or other uses in any industry. In alternative embodiments, at least some of the data noted above as being stored in a portable identification key may instead be stored and retrieved from a remote or central server. For example, a portable identification key may store a limited amount of data, such as an identification of a user, department, or application. Based on the identification of a user, department, or application, additional portable identification key data/instructions corresponding to the identification of a user, department, or application may be retrieved by the digital processing device from one or more remote/central servers. These additional items of data/instructions may be stored in user specific profiles.

The portable identification key may be connected to the digital processing device and the digital processing device may access user profile information stored on or otherwise obtained from the portable identification key, at step 106. User profile information may include, for example, identification of a user, a user group or an application. In a next step 108, it is determined whether a user is an authorized user. Determining whether the user is an authorized user may also include determining privilege settings for the user. Determining whether a user is an authorized user may be used to prevent privileged or confidential data from being distributed to unauthorized entities. The privilege or authorization settings may be set directly on the digital processing device or within the overall network. The privilege settings also might vary with different degrees and levels of permissions.

At step 110, instructions are retrieved and provided to the digital processing device for performing workflow actions for the user. Instructions may be retrieved from the user profile stored on the portable identification key and/or the remote server, which may include instructions for automating workflow in, for example, the creation of digital media streaming, archiving, and content distribution systems. The digital processing device performs a query to find any matches between the profile information stored on the portable identification key (or alternatively on a central server) and the digital processing device, at step 112. For example, a digital processing device may include user profile information for each user with the portable identification key. Therefore, each time a user connects his key to the digital processing device, the digital content being captured or recorded may be associated with the user's profile information. Querying profile information may also include querying parameters for workflow processes and querying devices required for the workflow processes.

The digital processing device creates metadata that uniquely identifies a workflow (e.g., a capture or recording session), at step 114. For example, each time a user connects the portable identification key to the digital processing device is a new capture session. Each capture session may be associated with the user's profile information stored on the portable identification key and/or on remotely. In addition, the portable identification key may include information about a user, user group, or application that a streaming, recording, and/or distribution system can use to automate equipment operation, associate the metadata with media content, and distribute that content.

Then the workflow session is initiated, at step 116. The workflow session may include, for example, recording or streaming of digital media. The type of media may include various types including performances, presentations, movies, instructional videos, and the like. Initiating a recording session may include recording content to storage in accordance with user profile information/instructions and session parameters. Upon detecting a removal of the portable identification key, step 118, the workflow session ends, step 120. Otherwise, the workflow session continues while the portable identification key is connected to the digital processing device. The recorded content may be stored on the digital processing device according to the session parameters.

Figure 2:
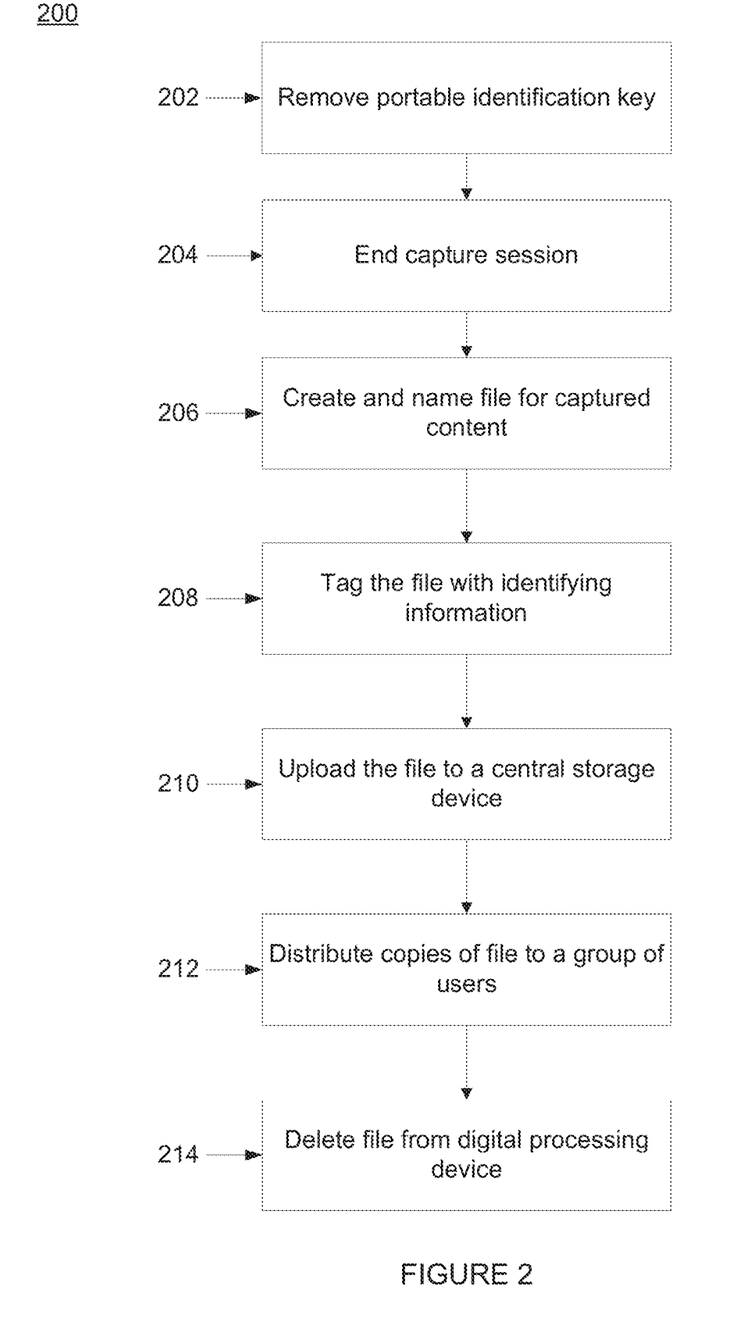
FIG. 2 illustrates a flowchart of a method for uploading digital media content to a central storage device.

FIG. 2 is a flowchart of an exemplary method for uploading digital media content to a central storage device according to an embodiment. As discussed above, a portable identification key may be connected to a digital processing device to facilitate the storage and capture of digital media content. The portable identification key is removed from the digital processing device, at step 202. Once the portable identification key is removed, a capture session is ended, step 204. The end of the recording session stops the capture of the recorded media and stores recorded media content. The digital processing device creates a file for the recorded content and names the file, at step 206. The file that is created may be of a universal file format to enable compatibility with multiple different types of devices and systems. The name of the file may be named anything related to the in-depth metadata stored of the user profile or situational information, such as time or date.

The created file pertaining to the recorded digital content may be tagged with identifying information, at step 208. The file may be tagged with any type of identifying information, such as author, time, date, keywords, or the like. The tags of the file may be used to facilitate useful keyword searches among multiple different files. Also, the tags of the files may be used to group files together based on related tags to also provide faster file retrieval. The tags may be generated automatically from the information or instructions provided in the user's profile. The file is then uploaded by the digital processing device to a central storage device via a network connection, at step 210. It will be appreciated that the network connection of the digital processing device and the central storage device may be of many different types of connections, such as Local Area Network (LAN), Wide Area Network (WAN), Internet, FireWire cable, wireless connection, peer-to-peer network, Bluetooth®, and the like.

At the central storage device, the files may be organized a multitude of ways, such as each user profile, group, or application may have its own personal library for uploading and storing files. The central storage device facilitates distributing copies of file(s) to a group of users between selected users, groups or applications, at step 212. The term "central" does not necessarily indicate a specific location, architecture, or structure. The central storage device is a device that may act as a "central" location for easy storage and content retrieval. Information pertaining to distribution lists, authorized users and content may be stored on the central storage device. To prevent unauthorized users from accessing the file, the file may be automatically deleted from the digital processing device at step 214, as determined by the profile and parameters for a given session. The uploading, distribution, and/or archiving of the media file may be accomplished automatically from the information or instructions provided in the user's profile, and/or the media file's metadata created therefrom.

Figure 3:
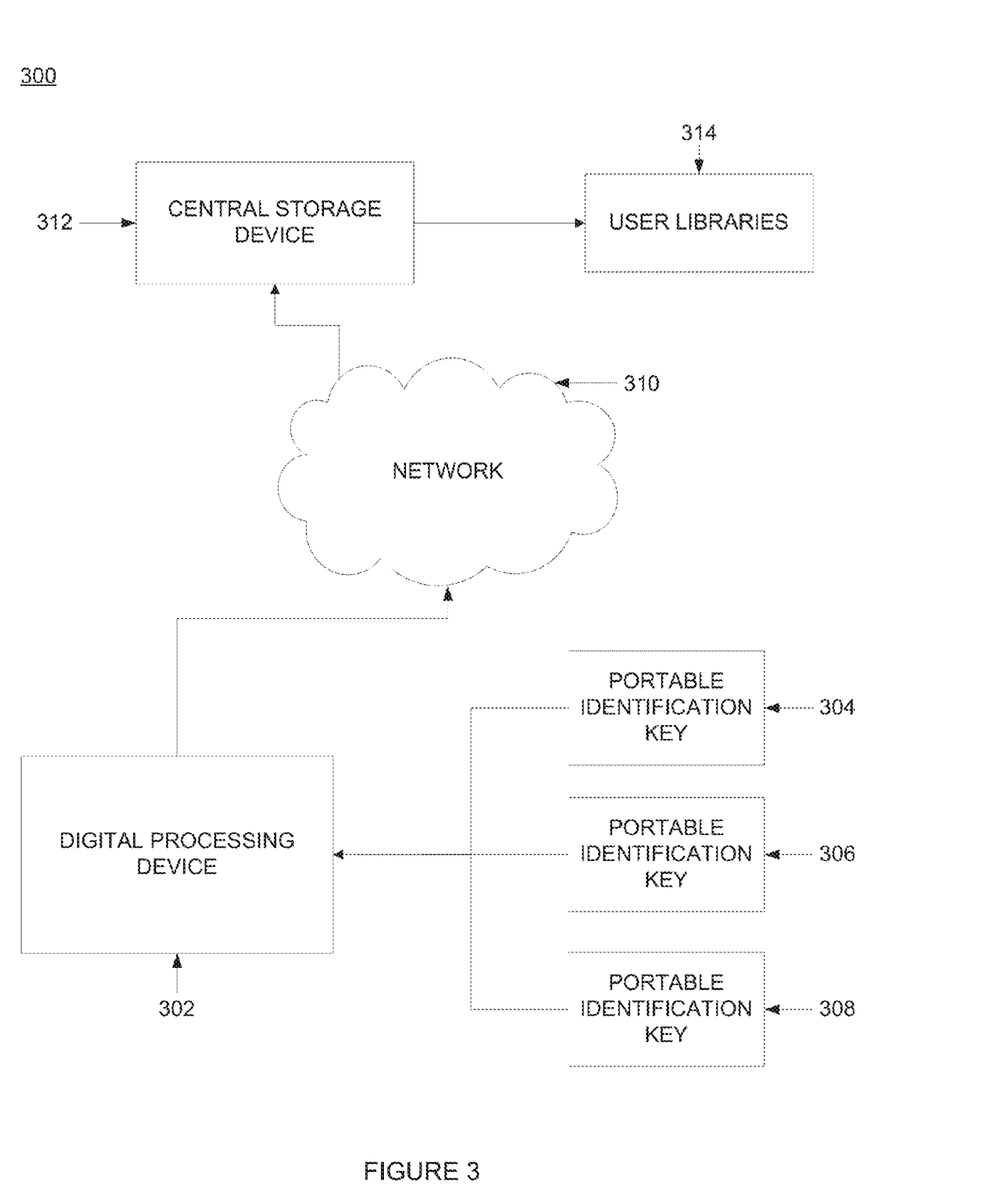
FIG. 3 illustrates a system for creating, managing, and automating workflow.

FIG. 3 illustrates a secure content management system for creating, and automating workflow. The system 300 of FIG. 3 includes a digital processing device 302, portable identification keys 304, 306, 308, a network 310, a central storage device 312, and user libraries 314. Each of the portable identification keys 304, 306, and 308 is capable of being connected to digital processing device 302. Digital processing device is configurable for communication with the central storage device 312 via the network 310. The digital processing device 302, for example, is capable of receiving, capturing, recording, and streaming digital media content.

The digital media content may be received by digital processing device 302 from the network 310 or from another source (not illustrated). Examples of the types of sources a digital processing device may receive digital media content from include media capture devices, such as cameras, microphones, document cameras, still cameras, set top boxes, any computing device with capability of displaying graphics, video, audio, still images, or any software application that can output to a capture device. According to one embodiment, digital processing device 302 may be preloaded with instructions or commands that are configured to respond or perform automated workflow processes according to data received from portable identification keys 304, 306, and 308. The digital processing device 302 may include software that is capable of receiving input data from portable identification keys 304, 306, and 308 and performing actions based on the input data. According to another embodiment, digital processing device 302 may perform a given workflow based on specific data provided from portable identification keys 304, 306, and 308.

The portable identification keys may include textual character strings that uniquely identify a user, group or application; detailed metadata pertaining to a user, group, application or captured content; a list of commands relating to workflow the system should perform; a list of the technical settings and parameters required for a particular workflow session; instructions to the software for actions to perform either internally or on other external computer, electrical, electronic, mechanical and electromechanical systems and equipment; and any combination of the above. The types of groups may include classes, teams, departments, etc. The types of applications may be a video newsletter, an internal broadcast, or a seminar, etc. The portable identification keys 304, 306, and 308 are capable of being communicatively connected to the digital processing device 302. The portable identification keys 304, 306, 308, etc., may be any portable data storage medium and/or electronic input device that acts as a key to uniquely identify a user, a group, or an application.

The key may utilize any number of types of technology. Examples may include but are not limited to: a Secure Digital (SD) card, a MicroSD card, a USB drive, an RFID tag, a card with a magnetic strip, a bar code, or any other type of portable storage medium. According to one example, a portable identification key may be embedded in a data ID card used to identify and/or grant specific authorization access to employees, members, staff, etc. Further examples of types of devices that the portable identification key may be include touchscreens, numeric keypads, and biometric devices such as fingerprint readers, retinal scanners, voice recognition systems, and facial recognition systems. Therefore, depending on the type of technology of the portable identification key, the method of connecting the portable identification key to the digital processing device will be in accordance with the technology. For example, if the portable identification key is a USB drive, the digital processing device 302 would provide the capability of communicating with a USB device.

The portable identification keys 304, 306, 308, each may have profile information identifying a user, a group and/or an application. The digital processing device 302 reads the profile information stored on at least one of the portable identification keys 304, 306, 308. Also, each portable identification key 304, 306, 308 may have a defined file structure that includes data fields, such as filename, author, record profile, local director, remote director, and other metadata. It will be appreciated that the portable identification keys 304, 306, 308 are not limited to those data fields and may have only some of those data fields or other data fields not listed.

It should be appreciated that in such a system 300, there may be multiple digital processing devices 302. Each digital processing device 302 being capable of communicating with the central storage device 312 via the network 310 and communicating with each of the portable identification keys 304, 306, 308. The network connection of the digital processing device and the central storage device may be of many different types of connections, such as LAN, WAN, Internet, FireWire cable, wireless connection, peer-to-peer network, Bluetooth®, and the like.

In one embodiment, the files within the central storage device 312 may be organized a multitude of ways such as each user profile, group, or application may have its own personal library for uploading and storing files. For example, files uploaded to central storage device 312 may be saved in a user's personal library. The user's personal library may have authentication settings preventing unauthorized users from accessing the library. Also, the central storage device 312 may store information such as distribution lists. Or each time a user wishes to distribute files, the user may select each user to receive the file.

The user libraries 314 may be a separate storage device from the central storage device 312 or part of the central storage device 312. The central storage device 312 may also store authentication and user permission settings. The digital processing device 302 may access the central storage device 312 for authentication information to determine if a particular user attempting to access the digital processing device has correct permission settings. The step of determining if a digital processing device 302 is recognized may be determined by the central storage device 312.

The central storage device 312 may also have the capability of publishing the content of the user libraries to a web page. The web page may enable certain access rights associated therewith to prevent unauthorized access, such as requiring a user name and/or password for access. The publishing of the content of the user libraries may make accessing the content very convenient and simple. In one embodiment, at least some of the data stored in a portable identification key may instead be stored and retrieved from the central storage device 312. Portable identification key data stored in central storage device 312 may include data such as a list of commands relating to specific actions that a digital processing device should perform, a list of technical settings and parameters required for a given workflow session, instructions to the digital processing device for actions to perform, or any combination thereof.

Figure 4:
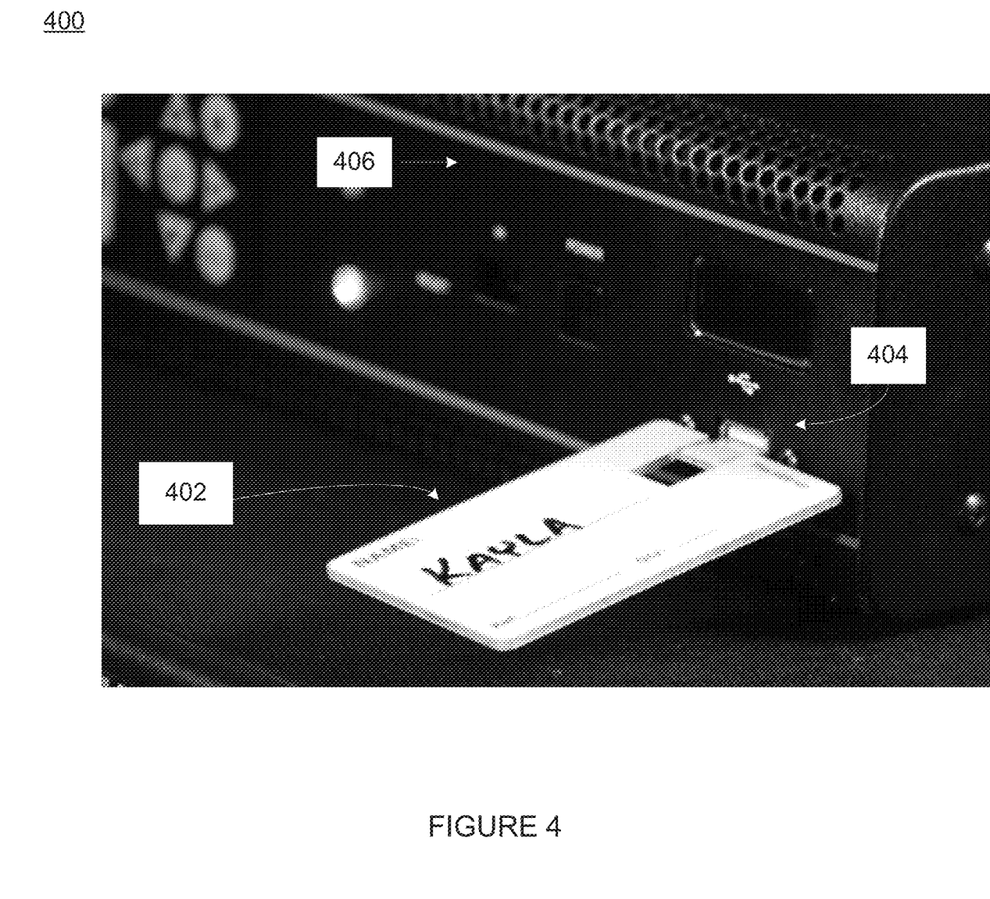
FIG. 4 illustrates one embodiment of a portable identification key connected to a digital processing device.

FIG. 4 illustrates one embodiment of a portable identification key connected to a digital processing device in a system 400. A portable identification key 402 may be a credit card-sized electronic device with a USB connection. The portable identification key 402 illustrates the possibility of having surface enabling a user to make identifying marks, such as fields for name, date, application, etc. The portable identification key 402 is connected to a digital processing device 406 using a USB port 404. It should be appreciated that this is one embodiment of the present invention for illustration purposes.

According to one exemplary embodiment, the digital processing device may be a multi-user Digital Video Disc (DVD) authoring system that allows multiple users to record multiple performances at random over time and burn a DVD that assembles any given user's performances as individual tracks on a single DVD. For example, a restaurant or bar may have a karaoke system. Different users may perform different songs throughout a session. Each user that wants to participate may be assigned a portable identification key. The portable identification key may be provided by the bar or restaurant.

Prior to each performance, the user's portable identification key is connected to a digital processing device. The digital processing device includes the capability of capturing the performance. The portable identification key may be connected to the digital processing device by a user or an employee of the bar designated for such a task. Once the performance is over, the portable identification key may be removed from the digital processing device. When a particular user desires at least some of their performances from the karaoke session, the user may reconnect the portable identification key to the digital processing device used to identify the user and allow access to the user's performances for selection to write to a DVD. The user may select specific performances, all of the performances or just one performance. The selected performances are then all burned onto one DVD. The local recordings may then be deleted after the content has been distributed or after a predetermined amount of time (e.g., days, weeks, months, etc).

Another exemplary embodiment is a streaming and archiving business solution. For example, a CEO of a company may attend weekly meetings with his executive team, as well as periodic meetings with other departments (e.g. sales and marketing, operations, etc.) The CEO may have a portable identification key for each type of meeting he/she needs to attend. When the weekly executive team meetings are held, the CEO may connect the portable identification key to a digital processing device at the beginning of a meeting. While the portable identification key is connected to the digital processing device, the meeting may be recorded. The audio and/or video of the meeting may be recorded in a capture/recording session. When the CEO removes the portable identification key, the digital processing device may end the recording. Because the portable identification key is associated with the CEO and the executive team meetings, the system may automatically upload the content in a secure directory on the central storage device for the CEO's private access. The content may also be uploaded to a secure directory shared by the executive team members or the content may be posted to a private webpage that only the CEO and his/her executive team may access.

This not only eliminates the need for technical staff to record a meeting, but the system also keeps the content secure among the executive team members. In many situations, it might be inappropriate for technical staff to have access to the content of such meetings. In this way, the portable identification key allows an individual to record every meeting without worrying about the operation of the system or the confidentiality of the content. This same individual may have different portable identification keys associated with other meetings or functions, such as a departmental meeting or a monthly address to all employees. If a portable identification key is assigned to each manager in an organization, all company meetings could be easily captured, organized, distributed and appropriately secured automatically, with the intervention of technical staffs into the physical meeting. This example illustrates how the system may be applied to existing markets for streaming technology to accelerate adoption by users.

Another exemplary embodiment automates operation of higher education in the field of medicine and allowing compliance with regulatory guidelines that would not otherwise be possible. Higher education in medicine involves the use of real patients in teaching applications. A surgeon may want to record a procedure for later viewing by medical students. A psychiatric department may want to record students' sessions for analysis and critique. In each of the cases, HIPAA privacy laws prohibit such content from being disseminated to anyone else, including technical staff that generally are required to operate the equipment and systems. Each doctor, instructor or student may be issued a portable identification key in these applications that would eliminate the need for technical staff intervention. This would not only facilitate the proliferation of streaming/archiving technology in such institutions but also provide compliances with HIPAA privacy laws.

It is also easy to see how a professor in a university may use this system to capture classes, automatically distribute the recordings to the appropriate students and even assign all of the appropriate metadata associated with the subject matter of the class. Since technical staff is generally required for the operation of such systems and equipment, educational staff such as a professor in a university, may not be qualified to write the appropriate metadata associated with the subject matter of a class. The present system and method may help to facilitate the proliferation of streaming/archiving technology in such institutions and in the field of education at large.

FIGS. 1 through 4 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method for automating workflow performing operations instructed by a portable identification key device, the method comprising:
   receiving, via a processing device, data from a portable identification key device communicatively coupled to the processing device, the data including profile information that identifies a specific user, parameters for specifying a unique workflow to the processing device to execute a pre-configured single-user session for the specific user on the processing device, and executable instructions;
   determining whether the specific user is authorized to access the processing device based on the profile information, and
   executing, via the processing device, the executable instructions upon determining that the specific user is authorized, wherein the executing of the single-user session comprises
   the processing device configuring one or more media capture devices to record media and initiate automated processes, according to settings based on the parameters for specifying the unique workflow, for ancillary equipment including one or more of the following: room lights, projectors, and switching systems;
   creating files from the recorded media based on the parameters for specifying the unique workflow, wherein the recorded media is associated with the profile information;
   tagging the created files with information based on the profile information and with metadata that identifies the single-user session;
   ending the single-user session upon detecting a removal of the portable identification key from the processing device; and
   deleting the created files from the digital processing device according to the profile information and the parameters for specifying the unique workflow.

2. The method of claim 1 wherein the portable identification key device comprises at least one of a smartcard, secure Universal Serial Bus device, Radio-Frequency Identification card, or magnetic strip card.

3. The method of claim 1 wherein the portable identification key device comprises at least one of a touch-screen, numeric keypad, fingerprint reader, retinal scanner, voice recognition system, and a facial recognition system.

4. The method of claim 1 wherein the profile information includes at least one of a user description, a user group, and an application.

5. The method of claim 4 wherein the profile information includes an application, and the application comprises one of a video newsletter, an internal broadcast, and a seminar.

6. The method of claim 1 wherein receiving data including executable instructions and parameters further comprises retrieving a list of commands relating to specific actions that the processing device should perform.

7. The method of claim 1 wherein receiving data including executable instructions and parameters further comprises retrieving a list of technical settings and parameters required for a given workflow session.

8. The method of claim 1 further comprising receiving digital media content from the one or more media capture devices.

9. The method of claim 8 wherein the unique workflow includes a recording of the digital media content.

10. The method of claim 9 wherein the recording of the digital media content is stored on the processing device according to the retrieved parameters.

11. The method of claim 1 wherein receiving data including executable instructions and parameters associated with the specific user comprises retrieving the executable instructions and parameters from the portable identification key device.

12. The method of claim 1 wherein receiving data including executable instructions and parameters associated with the specific user comprises retrieving the executable instructions and parameters from a remote server.

13. The method of claim 1 wherein determining whether the specific user is authorized to access the processing device further includes determining privilege settings for the user.

14. The method of claim 1 further comprising performing a query to match the profile information with the processing device.

15. The method of claim 1 further comprising creating metadata that uniquely identifies a workflow session.

16. The method of claim 1 wherein the processing device includes instructions configured to perform automated workflow processes according to the data received from the portable identification key device.

17. A portable identification key device for instructing a digital processing device to perform operations, the portable identification key device comprising:
   a non-transitory computer readable medium having profile information that identifies a specific user, parameters for specifying a unique workflow to the digital processing device to execute a pre-configured single-user session for the specific user on the digital processing device, and executable instructions stored therein; and
   a communication interface configured to transmit the executable instructions to the digital processing device upon the portable identification key device being connected to the digital processing device, wherein executing the executable instructions causes the digital processing device to:
   retrieve the profile information from the portable identification key device;
   determine whether the specific user is authorized to access the digital processing device based on the profile information, and
   execute the executable instructions, after determining that the specific user is authorized, to cause the digital processing device to execute the single-user session, the execution of the single-user session by the digital processing device comprising the digital processing device configuring one or more media capture devices to record media and initiate automated processes, according to settings based on the parameters for specifying the unique workflow, for ancillary equipment including one or more of the following: room lights, projectors, and switching systems, creating files from the recorded media based on the parameters for specifying the unique workflow, wherein the recorded digital media is associated with the profile information;

tagging the created files with information based on the profile information and with metadata that identifies the single-user session;

ending the single-user session upon detecting a removal of the portable identification key from the processing device; and deleting the created files from the digital processing device according to the profile information and the parameters for specifying the unique workflow.

\* \* \* \* \*